United States Patent
Trauernicht et al.

(10) Patent No.: US 7,126,147 B2
(45) Date of Patent: Oct. 24, 2006

(54) STORAGE PHOSPHOR READOUT SYSTEM USING RESONANT MICROCAVITY CONVERTER

(75) Inventors: David P. Trauernicht, Rochester, NY (US); Keith B. Kahen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 144 days.

(21) Appl. No.: 10/718,429

(22) Filed: Nov. 20, 2003

(65) Prior Publication Data

US 2005/0109962 A1 May 26, 2005

(51) Int. Cl.
*G01N 23/04* (2006.01)
(52) U.S. Cl. ................................... 250/586
(58) Field of Classification Search ............ 250/586, 250/580
See application file for complete search history.

(56) References Cited

U.S. PATENT DOCUMENTS

| | | | |
|---|---|---|---|
| 4,800,276 A * | 1/1989 | Noguchi ............ | 250/586 |
| 4,881,236 A | 11/1989 | Brueck et al. | |
| 5,138,161 A | 8/1992 | Miyagawa et al. | |
| 5,881,083 A | 3/1999 | Diaz-Garcia et al. | |
| 6,373,074 B1 | 4/2002 | Mueller et al. | |
| 6,392,341 B1 * | 5/2002 | Jacobsen et al. ............ | 313/506 |
| 6,507,032 B1 * | 1/2003 | Hell et al. ............ | 250/484.4 |
| 6,644,792 B1 | 11/2003 | Jeanmaire et al. | |
| 2002/0008212 A1 | 1/2002 | Arakawa et al. | |
| 2003/0075720 A1 * | 4/2003 | Liao et al. ............ | 257/79 |
| 2003/0132395 A1 * | 7/2003 | Livingston ............ | 250/458.1 |

FOREIGN PATENT DOCUMENTS

EP 1 103 846 5/2001

OTHER PUBLICATIONS

Owen et al., Progress toward prototype high-definition video-projection CRTs using resonant microcavity phosphor display technology, Sep. 2003, Proceedings of SPIE, vol. 5080, pp. 218-225.*
M. Berggren et al., Light amplification in organic thin films using cascade energy transfer, Nature, vol. 389 389, pp. 466-469, Oct. 1997.
Applied Physics Letters, vol. 72, No. 11, Mar. 1998, H. Becker et al., Light emission from wavelength-tunable microcavities, pp. 1266-1268.

* cited by examiner

*Primary Examiner*—David Porta
*Assistant Examiner*—David S. Baker
(74) *Attorney, Agent, or Firm*—William F. Noval

(57) ABSTRACT

A storage phosphor imaging system comprising: a source for producing stimulating radiation directed to a storage phosphor storing a latent image; a resonant microcavity converter for converting emitted radiation from the storage phosphor to radiation at a longer wavelength than the emitted radiation but with an angular intensity distribution that is substantially narrower than a Lambertian distribution; and a detector for detecting the longer wavelength radiation.

13 Claims, 4 Drawing Sheets

FIG. I

STORAGE PHOSPHOR READOUT SYSTEM USING RESONANT MICROCAVITY CONVERTER

FIELD OF THE INVENTION

This invention relates in general to a readout and detection system for storage phosphor screens used in radiographic imaging systems. More particularly, it relates to the inclusion in such a system of a device that converts electromagnetic radiation emitted from the screen in a wide angular distribution at one wavelength band into a narrower cone of emission at a longer wavelength band.

BACKGROUND OF THE INVENTION

Storage phosphor based radiographic imaging systems (computer radiography) are currently in widespread use. These systems use screens containing phosphor material that store a portion of the incident ionizing radiation as latent storage sites. These sites are subsequently stimulated to release electromagnetic radiation (the stimulated emission), typically in the 350 to 450 nanometer range, in proportion to the amount of ionizing radiation that was absorbed by the phosphor material. The typical readout method used in these systems is the so-called flying-spot scanning method. A focused laser beam, typically in the 600 to 700 nanometer range, is raster scanned over the surface of the screen to stimulate the storage sites. Synchronously, the stimulated emission is collected, detected, and digitized. The pixel size of the image is determined by the raster rate and digitization rate. After readout, the screens are flooded with erasing light to remove any remaining storage sites so the screen can be reused.

An alternative configuration described in U.S. Pat. No. 6,373,074, issued Apr. 16, 2002, inventors Mueller et al., and U.S. patent application Publication 2002/0008212A1, published Jan. 24, 2002, inventors Arakawa et al., is one where a line of stimulating electromagnetic radiation is used, and the stimulated emission is re-imaged onto a linear segmented detector such as a photodiode array or a charge-coupled device (CCD). For this line stimulation, the pixel size is determined by the digitization rate in one direction, and by the optical imaging and detection system in the other direction.

One of the challenges for any configuration of stimulation and detection is collecting a large fraction of the stimulated emission so as to obtain high image quality. The stimulated emission is emitted in a broad angular range. For most systems, the emission is close to being Lambertian (a $\cos(\theta)$ fall off in intensity with angle of emission). For the raster-scanned systems, the typical collection systems have a large acceptance angle for the stimulated emission, and are highly reflective and shaped so that the emission is directed to a fairly large area detector, such as, a photomultiplier tube. For some systems, the collector is a light-pipe, i.e., a plastic conduit that uses total internal reflection to guide the stimulated emission to the detector. Given that the typical stimulated emission wavelength range is 350 to 450 nanometers, the plastic must have a high transmittance for ultraviolet and blue electromagnetic radiation. For the imaged line-stimulation systems, the collection optics used must have a very low f-number to collect a large fraction of the emission. This places constraints on the depth of field of such an imaging system. Also, such low f-number optics can be more expensive than higher f-number optics. If the range of emission angles could be narrowed, the collection optics could be greatly simplified, thus saving space and cost. One such method of altering the emission angle range is disclosed in U.S. Pat. No. 6,507,032, issued Jan. 14, 2003, inventors Hell et al., in which microlenses are formed on the surface of the screen in an attempt to narrow the range of emission angles. This technique can only slightly narrow the emission cone, and adds manufacturing cost to each screen. It also does not alter the wavelength of the emission as discussed in the next paragraph.

Another challenge is to detect the stimulated emission with very high quantum efficiency (QE). The typical wavelength of the emission is 350 to 450 nanometers. For the raster-scanned systems, the detector is typically a photomultiplier tube (PMT). The QE of a typical PMT has a value around 25% at 400 nanometers for a bi-alkali photocathode. For the re-imaged systems, typical CCD detectors have a QE at 400 nm that is typically 50% or lower. If the wavelength of the emission could be shifted towards longer wavelength, then CCD and other semiconductor detectors will detect the emission with higher QE.

SUMMARY OF THE INVENTION

According to the present invention, there is provided a solution to these problems.

According to a feature of the present invention, there is provided a storage phosphor imaging system comprising:

a source for producing stimulating radiation directed to a storage phosphor storing a latent image;

a resonant microcavity converter for converting emitted radiation from said storage phosphor to radiation at a longer wavelength than said emitted radiation but with an angular intensity distribution that is substantially narrower than a Lambertian distribution; and a detector for detecting said longer wavelength radiation.

ADVANTAGEOUS EFFECT OF THE INVENTION

The invention has the following advantages.

1. A storage phosphor readout system is provided that results in a narrower range of stimulated emission angles and shifts the wavelength to longer wavelengths where common semiconductor photodetectors have high QE.

DETAILED DESCRIPTION OF THE INVENTION

As described in detail herein below, the present invention provides for a storage phosphor readout system that results in a narrower range of stimulated emission angles and shifts the wavelength to longer wavelengths where common semiconductor photodetectors have high QE. The incorporation of a resonant microcavity device is used to perform this stimulated emission transformation.

Figure 1:
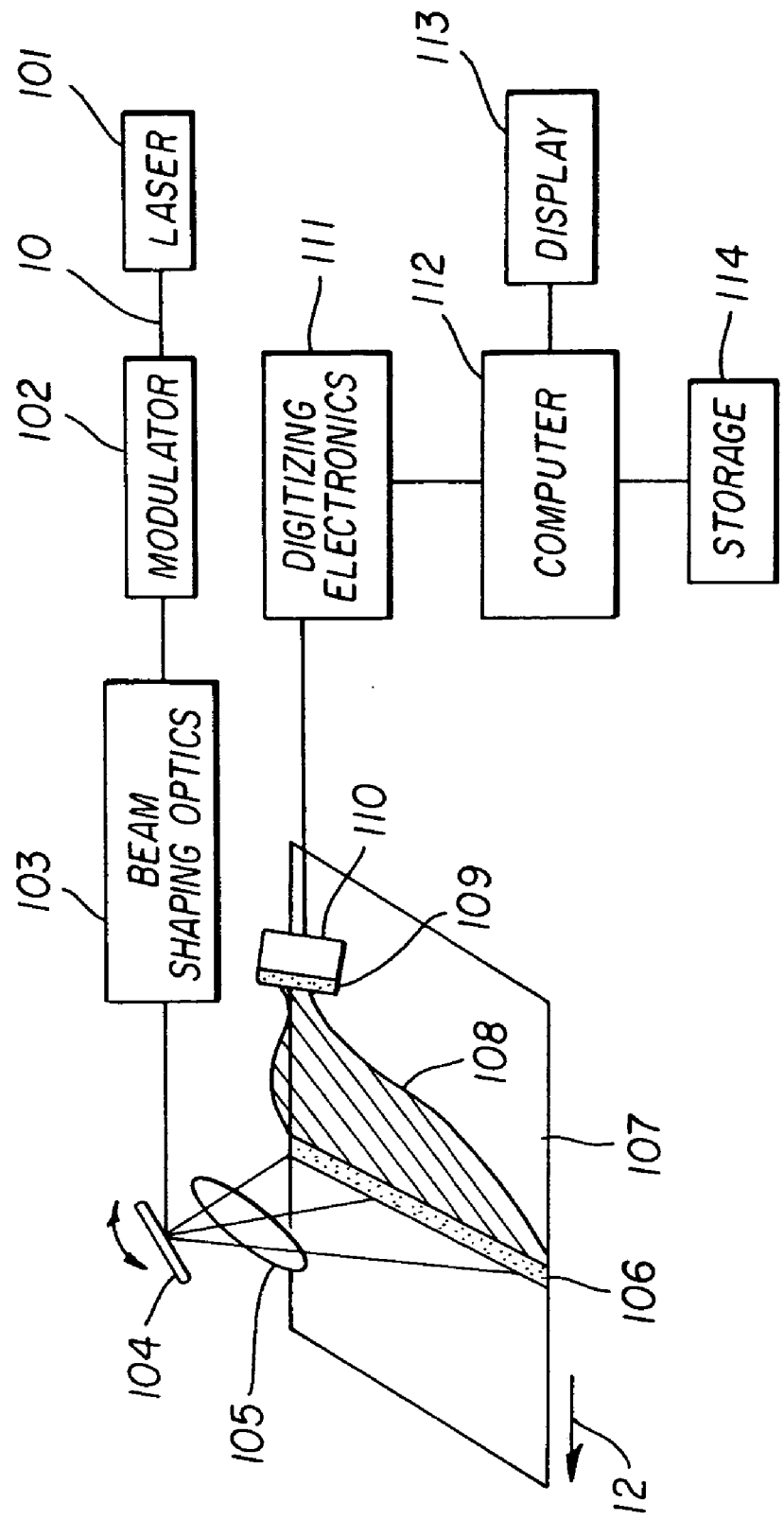
FIG. 1 shows a schematic diagram of a storage phosphor readout system using the flying-spot method that includes an embodiment of resonant cavity converter according to the invention.

Referring to FIG. 1, there is shown a storage phosphor readout system incorporating a resonant microcavity device according to the present invention. Laser 101 produces a laser beam 10 passed through an intensity modulator 102 for control of the laser exposure during the scan, e.g., turning off the laser during the retrace if a scanning galvonometer is used for laser beam steering. The laser beam 10 is then passed through beam shaping optics 103 that expand the beam to the desired size so subsequent focusing and steering optics 105 produce the desired spot size on the storage phosphor screen 107. The laser beam is raster-scanned in a line scan across the screen 107 in the fast-scan direction by either a galvonometer scanner or a rotating polygon mirror 104. The storage phosphor screen 107 is translated in the slow-scan direction 12 (perpendicular to the laser raster) at a rate such that the desired pixel size is obtained in the slow-scan direction. According to the invention, a resonant microcavity converter 106 is placed in close proximity to the storage phosphor screen 107 so that the laser beam 10 passes through it. The stimulated emission from the storage phosphor screen 107 is emitted with an intensity profile that is approximately Lambertian. The phosphor emission is absorbed by converter 106 and converted to an emission at a longer wavelength than the stimulated phosphor emission, but with an angular intensity distribution that is substantially narrower than Lambertian. A Lambertian distribution is one in which the intensity of emission per unit solid angle decreases as the cosine of the angle measured from the normal to the emitting surface. Thus, a Lambertian has a full-width-at-half-maximum (FWHM) of +/−60 degrees since the cosine of 60 degrees is 0.5. The converter 106 has an angular intensity distribution that is substantially less than Lambertian. Thus, the angular intensity distribution of the converter emission decreases faster than cosine of the emission angle. The preferred converters for this application have an angular intensity distribution with a FWHM that is less than or about +/−45 degrees, or more preferentially a FWHM that is less than or about +/−30 degrees.

The converter emission is collected by the collector 108 and directed towards the filter 109. This filter blocks the laser radiation from being sensed by the detector 110, but passes the majority of the converter emission. The detector 110 senses the converter emission and provides a signal to the subsequent digitizing electronics 111. The entire system is controlled by the computer 112. The image data may be viewed on the display 113, and stored in the storage device 114.

Figure 2:
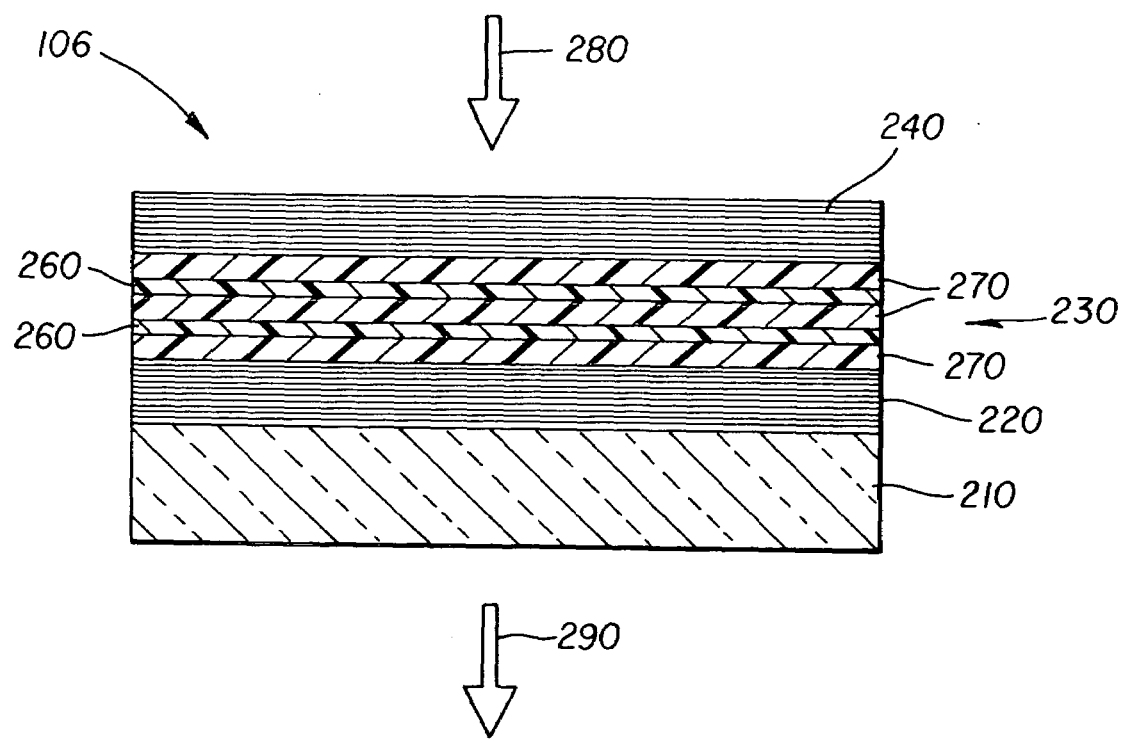
FIG. 2 shows a cross-sectional view of the resonant cavity converter of FIG. 1.

The converter 106 is a resonant microcavity device. Shown in FIG. 2, is a cross-section of an exemplary configuration of such a converter. As shown, converter 106 includes substrate 210 that is transmissive to both the converter emission and the storage phosphor stimulation light. The substrate 210 may be transparent glass or plastic. On the substrate 210 is deposited a bottom dielectric stack 220, which is composed of alternating high and low refractive index dielectric materials. The bottom dielectric stack 220 is designed to be reflective to the microcavity emission over a predetermined range of wavelengths, but transmissive to the storage phosphor stimulation wavelength. Typical high and low refractive index materials are $TiO_2$ and $SiO_2$, respectively. However, $Ta_2O_5$ may be used instead of $TiO_2$. The bottom dielectric stack 220 is deposited by standard electron-beam deposition, where a typical deposition temperature is 240° C. The organic active region 230 is deposited over the bottom dielectric stack 220. The active region can be composed of small-molecular weight organic material, conjugated polymeric organic material, or a combination of the two. The small-molecular weight organic material is typically deposited by high vacuum ($10^{-6}$ Torr) thermal evaporation, while the conjugated polymers are usually formed by spin casting.

FIG. 2 shows the organic active region 230 is not a bulk layer but a multilayer composite. Following the suggestions of Brueck et al. in U.S. Pat. No. 4,881,236, issued Nov. 14, 1989, inventors Brueck et al., for inorganic VCSEL lasers, the organic active region 230 contains one or more organic periodic gain regions 260, which are separated by spacer layers 270. The thickness of the organic periodic gain regions 260 is typically less than 50 nm, with a preferred thickness of 5 to 25 nm. The thicknesses of the spacer layers 270 are chosen such that the organic periodic gain regions are aligned with the antinodes of the cavity's standing electromagnetic field. Employing periodic gain regions in the active region results in larger power conversion efficiencies and a large reduction in the unwanted spontaneous emission. In summary, the active region 230 includes one or more organic periodic gain regions 260 and spacer layers 270 disposed on either side of the periodic gain region(s) and arranged so that the periodic gain region(s) is aligned with the antinodes of the device's standing wave electromagnetic field. The number of active periodic gain regions is chosen to obtain the desired absorption of the phosphor's stimulated emission. The number of periodic gain regions will typically be in the range of 2 to 10.

The organic periodic gain regions 260 are composed of either small-molecular weight organic material or polymeric organic material that fluoresce with high quantum efficiency. In this embodiment it is preferred to use a host-dopant combination as the gain media since it can result (via the mechanism of Forster energy transfer) in a very small unpumped band-to-band absorption coefficient, <1 cm$^{-1}$ for the gain media at the emission wavelength (M. Berggren et al., Nature 389, 466 [1997]). An example of a useful host-dopant combination for green-emitting microcavities is aluminum tris(8-hydroxyquinoline) (Alq) as the host and [10-(2-benzothiazolyl)-2,3,6,7-tetrahydro-1,1,7,7-tetramethyl-1H,5H,11H-[1]Benzopyrano[6,7,8-ij]quinolizin-11-one] (C545T) as the dopant (at a volume fraction of 0.5%). Other host-dopant combinations can be used for emission in other wavelength regions, such as in the blue and red.

For organic periodic gain regions 260 that include polymeric material, they can be composed of a single polymeric component, a blend of two or more polymeric materials, or a doped polymer or polymer blend. The gain media can also be a combination of more than one non-polymeric and polymeric materials with or without dopants. Typical dopants are listed previously for non-polymeric molecules.

Non-polymeric dopants can be molecularly dispersed into the polymeric host, or the dopant could be added by copolymerizing a minor constituent into the host polymer. Typical polymeric materials include, but are not limited to, substituted and unsubstituted poly(p-phenylenevinylene) (PPV) derivatives, substituted and unsubstituted poly(p-phenylene) (PPP) derivatives, substituted and unsubstituted polyfluorene (PF) derivatives, substituted and unsubstituted poly(p-pyridine), substituted and unsubstituted poly(p-pyridalvinylene) derivatives, and substituted, unsubstituted poly(p-phenylene) ladder and step-ladder polymers, and copolymers thereof as taught by Diaz-Garcia et al. in U.S. Pat. No. 5,881,083 and references therein. The substituents include but are not limited to alkyls, cycloalkyls, alkenyls, aryls, heteroaryls, alkoxy, aryloxys, amino, nitro, thio, halo, hydroxy, and cyano. Typical polymers are poly(p-phenylene vinylene), dialkyl-, diaryl-, diamino-, or dialkoxy-substituted PPV, mono alkyl-mono alkoxy-substituted PPV, mono aryl-substituted PPV, 9,9'-dialkyl or diaryl-substituted PF, 9,9'-mono alky-mono aryl substituted PF, 9-mono alky or aryl substituted PF, PPP, dialkyl-, diamino-, diaryl-, or dialkoxy-substituted PPP, mono alkyl-, aryl-, alkoxy-, or amino-substituted PPP. In addition, polymeric materials can be used such as poly(N-vinylcarbazole) (PVK), polythiophenes, polypyrrole, polyaniline, and copolymers such as poly(3,4-ethylenedioxythiophene)/poly(4-styrene-sulfonate)also called PEDOT/PSS.

For the spacer layer 270 it is preferred to use a material which is highly transparent to the microcavity emission 290, the incident stimulated emission light 280 (produced by phosphor screen), and the laser light which stimulates the storage phosphor. In this embodiment an organic layer, 1,1-Bis-(4-bis(4-methyl-phenyl)-amino-phenyl)-cyclohexane (TAPC), is chosen as the spacer material, since it has very low absorption throughout the visible and near UV spectrum and its index of refraction is slightly lower than that of Alq. This refractive index difference is useful since it helps in maximizing the overlap between the standing electric-field antinodes and the periodic gain regions 260. Other useful spacer layer materials are inorganic compounds such at $SiO_2$, which can be deposited thermally or electron-beam evaporation.

Following the active region 230 is deposited the top dielectric stack 240. The top dielectric stack 240 is spaced from the bottom dielectric stack 220 and reflective to light over a predetermined range of wavelengths. Its composition is analogous to that of the bottom dielectric stack 220. Since the top dielectric stack 240 is deposited over an organic-based active region, its deposition temperature must be kept low in order to avoid melting the organics. As a result, a typical deposition temperature for the top dielectric stack 240 is 70° C. In order to obtain good emission efficiency, it is preferred that the peak reflectivity of the top dielectric stack 240 to the microcavity emission wavelength be greater than 99%, preferably greater than 99.9% in order to prevent microcavity light emission from exiting through it. For the bottom dielectric stack 220, in order to enhance the outcoupling efficiency, it is preferred that the stack reflectance be smaller than 99%, where further reductions in the bottom stack reflectance result in higher external efficiencies, larger spectral linewidths, and larger microcavity light emission cone angles. In summary, the bottom dielectric stack 220 should be selected so that it's peak reflectance is less than 99%. As a result, the spectral linewidth is increased, thereby resulting in improved power conversion efficiency. In fact, by lowering the bottom dielectric stack 220 peak reflectance to less than 85%, it was determined that the power conversion efficiency can be greater than 20%. For the common storage phosphor materials used with a peak stimulated emission wavelength around 400 nm, and a green emitting microcavity, this results in an external quantum conversion efficiency in excess of 30%.

As shown in FIG. 2, the microcavity converter 106 is optically driven by the stimulated emission from the phosphor screen 107 and emits light 290 with an angular intensity distribution that is substantially narrower than Lambertian. To improve the power conversion efficiency of the device, it is desirable to add additional dielectric layers to both dielectric stacks, such that the top dielectric stack 240 is highly transmissive to the phosphor emission 280 and the bottom dielectric stack 220 is highly reflective to phosphor emission. As a result of the designed converter structure, microcavity emission occurs mainly through the substrate 210. FIG. 2 shows the microcavity emission 290 through the bottom dielectric stack 220 and the substrate 210. Alternatively, the microcavity structure could be optically pumped through the substrate 210 and the bottom dielectric stack 220, with the microcavity emission mainly exiting through the top dielectric stack 240 by proper design of the dielectric stack reflectivities.

With the microcavity converter 106 in close proximity to the phosphor screen as in FIG. 1, one or both of the exterior surfaces of the converter may have additional dielectric stack coatings to minimize reflection of the laser stimulating light so as to reduce flare, i.e., laser radiation hitting regions of the screen other than the desired pixel area.

The configuration shown in FIG. 1 has a generically labeled collector 108. Collectors may be fabricated as light-pipe guides as disclosed in U.S. Pat. No. 5,138,161, issued Aug. 11, 1992, inventors Miyagawa et al. These light-pipe guides use total internal reflection to direct the emission to the detector 110, so the light propagates within the light-guide material. The common phosphor material used in storage phosphor screen 107 is a barium fluorohalide doped with europium. The emission of this material has a peak wavelength around 400 nm, with a full width at half maximum of around 40 nm, so the light-guide material of collector 108 must have a high transmission in the blue and near ultraviolet wavelength range for efficient collection, thus limiting the potential candidate materials. With the microcavity converter 106, the emission wavelength is shifted to the green wavelengths, so more plastic materials become candidates for fabricating the light-guide collector 108. Also, the light-guide 108 collecting the longer wavelength microcavity converter emission may not have to be as thick as a comparable direct stimulated emission light-guide collector since the range of microcavity emission angles is much less than the approximately Lambertian shape of the stimulated emission. As a modification to the configuration shown in FIG. 1, a cylindrical lens or an array of lenses could be used to gather and redirect the microcavity emission into the light collector 108.

Figure 3A:
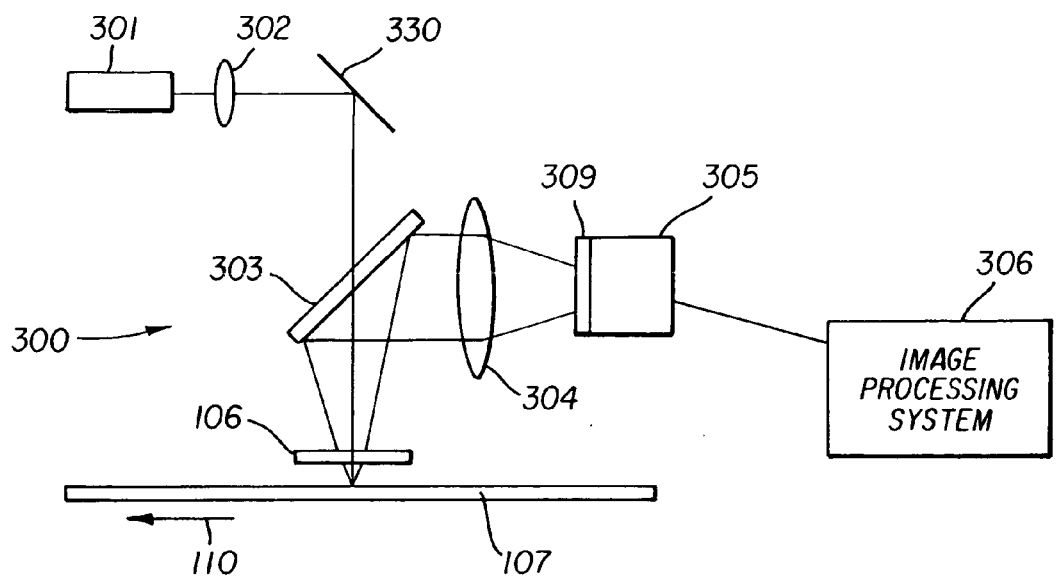
FIG. 3A shows a side elevational view of a line-stimulation readout system incorporating a dichroic reflecting filter and a resonant cavity converter according to the invention with both stimulation and collection occurring along a direction approximately 90 degrees to the screen surface.
Figure 3B:
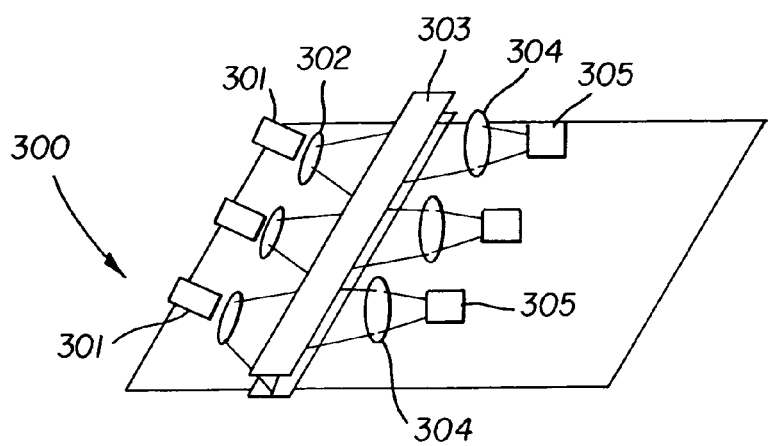
FIG. 3B is a diagrammatic view which shows a more distant view schematically showing more than one stimulating and detecting unit across the width of the screen of FIG. 3A.

In another preferred embodiment shown in FIGS. 3A and 3B, a line stimulation is used and a segmented detector is used to provide the pixel definition along the line of stimulation similar to that disclosed in U.S. Pat. No. 6,373,074, issued Apr. 16, 2002, inventors Mueller et al., and U.S. patent application publication 2002/0008212 A1, published Jan. 24, 2002, inventors Arakawa et al. FIG. 3B shows a more distant view of the stimulation and detection system. There are multiple stimulating and detecting subsystems 300. FIG. 3B shows the same number of stimulating light sources 301 with their associated lenses 302 and segmented detectors 305 with their associated imaging lenses 304, but that is not a requirement of this application. There can be an unequal number of stimulating light sources and segmented detectors. As shown in FIG. 3A there is at least one stimulating light source 301. The stimulating beam(s) are shaped into a focused line on the storage phosphor screen 107 by at least one corresponding lens(es) 302, reflected by mirror 330 first passing through dichroic filter 303 and the microcavity converter 106. The dichroic filter 303 transmits the long wavelength stimulating light but reflects the shorter wavelength microcavity converter emission. The microcavity converter 106 is placed in close proximity to the storage phosphor screen 107, the spacing from the top of the storage phosphor screen 107 being in the range of 0.025 to 0.5 mm, preferably in the range of 0.025 to 0.1 mm. The stimulated emission from the storage phosphor screen 107 is absorbed by the converter 106 and re-emitted by the converter 106 at a longer wavelength than the stimulated emission and in an intensity profile that is much narrower than a Lambertian. The converter emission is reflected by the dichroic filter 303 and directed towards at least one imaging lens(es) 304 that in turn focus an image of the emission onto the corresponding segmented detector(s) 305. The filter 309 drastically reduces the intensity of any remaining stimulating light that reaches the segmented detector 305, but passes a significant fraction of the converter emission so it can be sensed by the segmented detector 305. The output of the detector 305 is gathered, processed, stored, and potentially viewed by the image processing system 306. The storage phosphor screen 107 is translated in a direction 110 perpendicular to the line of stimulation at a rate such that the subsequent readings of the system result in the desired pixel size in the scanned direction.

The segment size of the detector 305 is chosen along with the magnification provided by imaging lens(es) 304 so that the desired pixel size is obtained in the line-stimulation direction. The converter 106 in this configuration has similar properties and construction as has previously been described. To maintain the optimal gap between the microcavity converter 106 and the associated collection and detection components, and also to prevent collisions with the surface of storage phosphor screen 107, some means of active positioning may be necessary. This active positioning function is not shown in the figure, but by its mention here is understood to be a potential component of the configuration shown in FIG. 3A.

Figure 4:
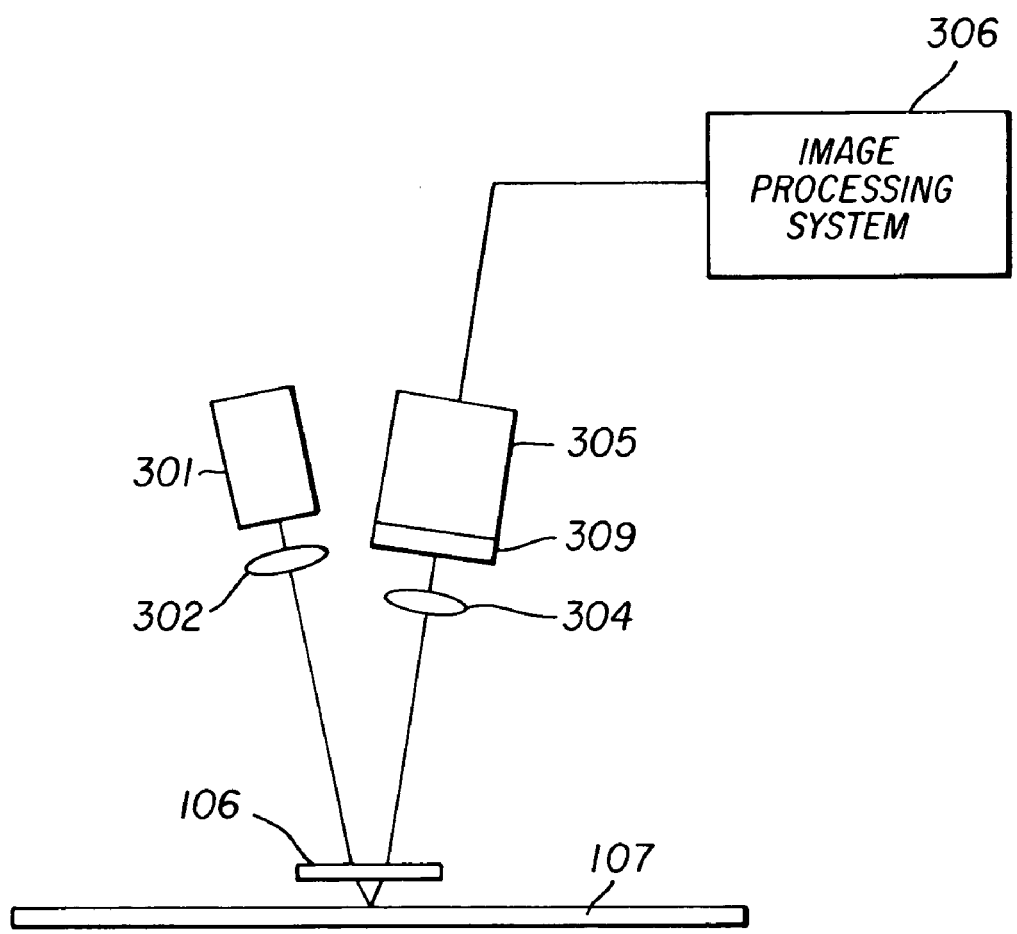
FIG. 4 shows a side elevational view of a line-stimulation readout system using a resonant cavity converter of the invention with the stimulation occurring along a direction less than 90 degrees, and the collection occurring along a direction approximately 90 degrees to the screen without a dichroic reflecting filter.

Another preferred embodiment is shown in FIG. 4. This configuration is very similar to that shown in FIG. 3, but the dichroic filter has been removed and the stimulating light source 301 impinges on the storage phosphor screen 107 at an angle less than 90 degrees. The segmented detector 305, the imaging lens 304 and the filter 309 are oriented so as to be at an angle greater than 90 degrees to the phosphor screen 107 and converter 106. Considerations of the converter to screen spacing and screen transport are the same as described above for FIG. 3A.

The configurations shown in FIG. 3A and FIG. 4 have the line stimulation and collection across the entire screen width, with the screen scanned relative to the stimulation and collection system. An alternative configuration is for the line stimulation and collection system (301, 302, 303, 106, 304, 305, 309) to be smaller so that only a short linear segment is stimulated, with the direction of the linear stimulation line now being parallel to the screen motion direction. This smaller stimulation and collection system is raster-scanned across the screen in a manner similar to that done for inkjet printheads in well-known inkjet printers. However, instead of laying ink down with a printer, this stimulation and detection system lays down stimulation exposure and collects and detects the corresponding emission. As mentioned above, some means of controlling the spacing between the stimulation and collection system and the phosphor screen may be needed to maintain the desired image resolution, and to prevent any collisions between the converter and the phosphor screen.

Figure 5:
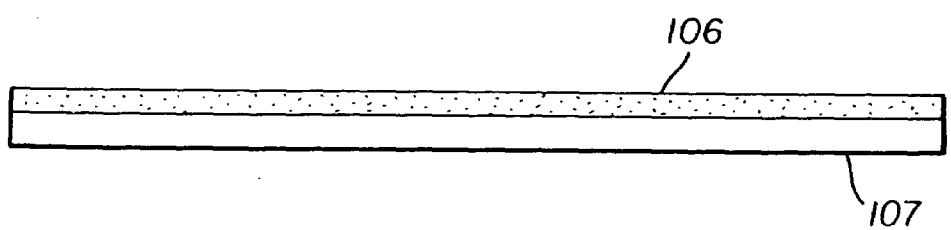
FIG. 5 shows a cross-sectional elevational view of a configuration with the resonant converter of the invention in intimate contact with the storage phosphor screen.

In another preferred embodiment shown in FIG. 5, the microcavity converter 106 covers, and is in intimate contact with but not optically coupled to, the storage phosphor screen 107. The different geometrical configurations for reading out the storage phosphor screen as shown in FIG. 1, FIG. 3A and FIG. 4 can still be used, but the converter is now covering the entire screen. The advantage here is mainly for the re-imaging of the line stimulation configuration of FIG. 3A and FIG. 4. With the intimate but not optical contact between the screen and the converter, there is no loss in resolution of the re-imaged converter emission since there is no gap between the screen and the converter. For this embodiment when using the common europium-doped barium fluorohalide phosphor screens, the dielectric stacks of the converter should be designed such that some transmission in the range of 425 to 500 nanometers occurs to maximize the use of the light coming from the erase lamps since common erase lamps are broad wavelength emitters.

Although specific storage phosphor screen materials have been described that are stimulated with light at specific wavelengths and produce emitted light at specific wavelengths, it will be understood that other storage phosphor screen materials may be used having stimulating and emitting light at different wavelengths. In such case, suitable microcavity converter materials would also be used.

The invention has been described in detail with particular reference to certain preferred embodiments thereof, but it will be understood that variations and modifications can be effected within the spirit and scope of the invention.

PARTS LIST 10 laser beam
12 slow-scan direction
101 laser
102 modulator
103 beam shaping optics
104 rotating polygon mirror
105 steering optics
106 microcavity converter
107 storage phosphor screen
108 light collector
109 filter
110 detector
111 digitizing electronics
112 computer
113 display
114 storage device
210 substrate
220 bottom dielectric stack
230 organic active region
240 top dielectric stack
260 organic periodic gain regions
270 spacer layers
280 stimulated emission light
290 microcavity emission
300 multiple stimulating and detecting subsystems
301 stimulating light source
302 imaging lenses
303 dichroic filter 304 imaging lenses
305 segmented detectors
306 imaging processing system
309 filter
330 mirror

What is claimed is:

1. A storage phosphor imaging system comprising:
a source for producing stimulating radiation directed to a storage phosphor storing a latent image;
a resonant microcavity converter for converting emitted radiation from said storage phosphor to radiation at a longer wavelength than said emitted radiation but with an angular intensity distribution that is substantially narrower than a Lambertian distribution; and
a detector for detecting said longer wavelength radiation.

2. The system of claim 1 including a light collector located to collect light from said converter and directing it to said detector.

3. The system of claim 2 wherein said light collector is a light-pipe guide.

4. The system of claim 2 including one of a cylindrical lens or array of lenses for gathering and redirecting radiation from said microcavity into said light collector.

5. The system of claim 1 wherein said converter is located in close proximity to and spans the width of a storage phosphor and including a scanner for scanning a beam of stimulating radiation from said source in a line scan of said phosphor, said stimulating radiation passing through said converter.

6. The system of claim 1 wherein said converter is coextensive in size with said storage phosphor and located in close proximity thereto.

7. The system of claim 1 wherein said converter includes:
a) a substrate;
b) a bottom dielectric stack reflective to light over a predetermined range of wavelengths and being disposed over the substrate;
c) an active region for producing microcavity emission;
d) a top dielectric stack spaced from the bottom dielectric stack and reflective to light over a predetermined range of wavelengths; and
e) the active region includes one or more periodic gain region(s) and spacer layers disposed on either side of the periodic gain region(s) and arranged so that the periodic gain region(s) is aligned with the antinodes of the device's standing wave electromagnetic field.

8. The system of claim 7 wherein stimulated emission light is transmitted and introduced into the active region through at least one of the dielectric stacks.

9. The system of claim 7 wherein one or more periodic gain region(s) is a combination of an organic host material and a dopant and the spacer layers are substantially transparent to stimulated emission light and microcavity emission light.

10. The system of claim 9 wherein the host material is aluminum tris(8-hydroxyquinoline), the dopant is [10-(2-benzothiazolyl)-2,3,6,7-tetrahydro-1,1,7,7-tetramethyl-1H,5H,11H-[1]Benzopyrano[6,7,8-ij]quinolizin-11-one], and the spacer layers includes 1,1-Bis-(4-bis(4-methyl-phenyl)-amino-phenyl)-cyclohexane or silicon dioxide.

11. The system of claim 7 wherein the periodic gain region includes polymeric materials.

12. The system of claim 1 wherein the emission from said resonant microcavity converter has an angular intensity distribution with a full-width-at-half-maximum of less than or about +/−45 degrees.

13. The system of claim 1 wherein the emission from said resonant microcavity converter has an angular intensity distribution with a full-width-at-half-maximum of less than or about +/−30 degrees.

* * * * *